United States Patent
Zumkeller

Patent Number: 6,088,349
Date of Patent: Jul. 11, 2000

[54] METHOD, TRANSMITTER AND RECEIVER FOR THE TRANSMISSION AND SELECTION OF LOCAL RADIO PROGRAMS IN A COMMON-WAVE BROADCASTING NETWORK

[75] Inventor: Markus Zumkeller, Schwaikheim, Germany

[73] Assignee: Grundig AG, Fuerth, Germany

[21] Appl. No.: 08/776,058

[22] PCT Filed: Jul. 13, 1995

[86] PCT No.: PCT/EP95/02751
§ 371 Date: Jun. 24, 1997
§ 102(e) Date: Jun. 24, 1997

[87] PCT Pub. No.: WO96/02988
PCT Pub. Date: Feb. 1, 1996

[30] Foreign Application Priority Data

Jul. 14, 1997 [DE] Germany ............. P 44 24 778

[51] Int. Cl.[7] ..................................... H04J 3/00
[52] U.S. Cl. ..................... 370/345; 370/343; 370/312
[58] Field of Search .................... 370/343, 312, 370/313, 342, 203, 206; 381/4, 14; 373/260

[56] References Cited

U.S. PATENT DOCUMENTS

| | | | |
|---|---|---|---|
| 4,485,483 | 11/1984 | Torick | 381/4 |
| 5,315,583 | 5/1994 | Murphy | 370/312 |
| 5,333,155 | 7/1994 | Dambacher | 375/240 |
| 5,452,288 | 9/1995 | Rahuel | 370/203 |
| 5,521,943 | 5/1996 | Dambacher | 375/295 |
| 5,544,198 | 8/1996 | Saalfrank | 370/343 |

Primary Examiner—Ajit Patel
Assistant Examiner—Ricardo M. Pizarro
Attorney, Agent, or Firm—Paul Vincent

[57] ABSTRACT

The common-wave broadcasting of radio programs is known in the art. Common-wave operation of radio transmitters allows the available transmission band width to be particularly well utilized, for example for national scale common-wave broadcasts. A new process now allows a stereo transmission channel to be divided into two mono transmission channels during radio broadcasts and to broadcast certain programs only through particular transmitters. Information concerning the division of the stereo transmission channel into two mono transmission channels is further broadcast over the entire common-wave transmission network. This information causes receivers tuned to this transmission channel to automatically switch to mono evaluation of the reception signal. On a regional level, information may also be broadcast concerning which of both mono transmission channels may be received. Alternatively, the receiver or user himself may select the mono transmission channel he wishes to receive. This process may be implemented with all common-wave broadcasting modes.

7 Claims, 3 Drawing Sheets

METHOD, TRANSMITTER AND RECEIVER FOR THE TRANSMISSION AND SELECTION OF LOCAL RADIO PROGRAMS IN A COMMON-WAVE BROADCASTING NETWORK

BACKGROUND OF THE INVENTION

The invention concerns a method for the transmission and reception of local radio programs in a common-wave broadcasting network, wherein the radio programs are transmitted in accordance with a multichannel transmission process, and additional regionally differing information are transmitted in transmission time windows which are not occupied by a common-wave broadcasting mode transmitted signal. The invention also concerns a transmitter and receiver for carrying out for this method.

An earth-based digital transmission method has been developed some years ago and is intended to provide for consistently high transmission quality comparable to that of digital recordings even in the event of a mobile receiver as well as a more efficient use of frequency. In the methods known in the art under the designations DAB (digital audio broadcasting) for radio and DVB (digital video broadcasting) for video transmissions, the transmission data are broadcast in a common-wave broadcasting network. In this fashion a particularly good usage of the transmission frequencies is achieved.

Known in the art from WO 88/00417 A3 is a transmission method for encoding and modulating data. Same are initially encoded with the introduction of error protection code in order to be able to recorrect transmission errors. Modulation then follows. Towards this end, a plurality of carrier frequencies are phase-modulated with the signal to be transmitted, and the carrier frequencies are scrambled in time as well as in frequency.

This transmission method has, however, the disadvantage that all information transmitted in the common-wave broadcasting network must be absolutely identical. Since, according to present plans, a common-wave broadcasting network will be broadcast across the entire country, it would then no longer be possible to transmit information in a regional manner only.

This disadvantage is obviated by the method described in DE 42 22 877 C2, wherein a method for the transmission of regionally differing information in a common-wave broadcasting network is disclosed. In accordance with this method, data are transmitted within time windows which are not occupied by a common-wave broadcasting signal via carrier frequencies also used in the other time windows. However, in contrast to common-wave broadcasting mode, these data are broadcast using frequency multiplexing via carrier frequencies which are different for each transmitter, as has been conventional up to this time in VHF transmission, so that two principally different transmission methods are utilized in a time multiplexed fashion. In this manner, it is possible to transmit the substantially larger fraction of transmission data in the common-wave broadcasting mode to make efficient use of frequency, and a small portion of the data which is only of local interest is transmitted with frequency multiplexing of the transmitter.

This has the disadvantage that the transmission capacity for local radio transmitters is insufficient, since only a relatively narrow time window (in accordance with the COFDM-protocol) is unoccupied by the common-wave broadcasting signals.

Known in the art from DE 4237692 C1 is a receiver for digital radio signals having a particularly advantageous circuit configuration. In this receiver, the received signal is split into real and imaginary signal components by switching-over an all-pass filter and is simultaneously mixed-down to an intermediate frequency. In this manner, the real and imaginary signal components are present in a time multiplexed fashion and components in the receiver are obviated which are conventionally required for parallel processing of real and imaginary components of the received signal.

Known in the art from DE 4223194 C1 is a method and a circuit configuration for the determination of the geographical location of a receiver in a common-wave broadcasting network. Towards this end, the rigidly phase-coupled transmission signal from differing transmitters is overlapped in the receiver to form beat frequencies. The subsequent localization of the receiver is facilitated by the phase difference of a plurality of beat frequencies from differing transmitters using one of the conventional hyperbolic localization methods (Decca or Loran-C).

Known in the art from DE 43 41 211 is a method and a circuit configuration for the introduction of data into a transmission signal. Herein, information which is to be transmitted only regionally is introduced in a frequency and time synchronous fashion in a DAB transmission signal of a transmitter for a common-wave broadcasting network. In this fashion it is possible to transmit regionally different additional information via transmitters in a common-wave broadcasting network whose transmission signals are normally absolutely identical.

Known in the art from DE 43 14 045 is a method for the transmission of digital, compressed audio and/or video signals, wherein the audio and/or video signals are associated with one or a plurality of radio programs. The digital data stream transmitted via the transmission channel is subdivided into a plurality of partial data streams. The partial data streams are transmitted using frequency and/or time multiplexing.

SUMMARY OF THE INVENTION

It is the purpose of the invention to introduce a new method and a new circuit configuration for transmitters and receivers which facilitates the local transmission and reception of radio programs in a common-wave broadcasting network. It should also be possible to change rapidly between radio programs.

This purpose is achieved in a method for transmission in accordance with the invention in that a transmission channel is subdivided in frequency and/or in time into a plurality of partial transmission channels, the partial transmission channels being used to transmit differing radio programs, and an identifier is transmitted on the basis of which the receiver recognizes which transmission channel is subdivided into partial transmission channels. The purpose is achieved in a transmitter in accordance with the invention in that a multiplexer scrambles the radio program to be introduced in frequency and/or time to form a partial transmission channel, a circuit configuration introduces this signal into a transmission channel of the signal broadcast in common-wave broadcasting mode, and a circuit configuration produces an identifier which contains information concerning the transmission channel used therefor and subdivided into partial transmission channels. The purpose is achieved in a method for reception in accordance with the invention in that that reception of an identifier indicating subdivision of a transmission channel into partial transmission channels facilitates switching of the decoding to a partial transmission channel in dependence on the transmission channel received in the receiver, and the receiver tunes to one of the two partial transmission channels using information transmitted in the control channel, using a transmitter identification and a receiver location, or using reception quality. The purpose is achieved in a receiver in accordance with the invention in that a control unit evaluates an identifier indicating subdivision of a transmission channel into two partial transmission channels and the receiver tuning circuit tunes to one partial transmission channel.

The method in accordance with the invention allows for the advantageous possibility of subdividing a transmission channel into partial transmission channels. The programs transmitted via the partial transmission channels can be transmitted by all or only by selected transmitters.

Furthermore, the receiver automatically switches decoding in dependence on the identifier transmitted in the information channel. Due to this additionally transmitted identifier, the receiver recognizes whether or not the currently received transmission channel is subdivided into partial transmission channels.

In a preferred embodiment only certain transmitters of the transmitters tuned to the common-wave broadcasting network are used for partial transmission channel broadcasting of a radio program. This has the advantage of limiting the transmission area of a local radio program. In this fashion the receiver does not, for example subsequent to a station finding process, output a local radio station having local news coming from a distant region. It is thereby also possible for transmission channels to be occupied a plurality of times if the distance between transmitters using these is sufficiently large.

In an preferred embodiment the identifier of each transmitter in the common-wave broadcasting network is transmitted via a control channel, the identifier containing information concerning which of the transmission channels transmits regionally differing information. This has the advantage that an identifier can be transmitted in the control channel FIC (fast information channel) in which control data are transmitted to the receiver to characterize the transmission channel which is subdivided into partial transmission channels. In this manner expensive and time-consuming evaluation processes for the recognition of which transmission channel is being used or which can be decoded, are avoided. In addition, this information facilitates the allocation of a particular partial transmission channel to one receiver in dependence on its location. In this fashion, limitation of the transmission region of a local radio program is possible.

In a preferred embodiment the identifier is transmitted in common-wave broadcasting mode and the regionally differing information transmit which of the partial transmission channels broadcast regionally differing information. This has the advantage that the identifier of which transmission channel is subdivided into partial transmission channels is transmitted in common-wave broadcasting mode. In this fashion, transmission capacity of the regional transmitted information is not required in the zero-symbol. Information differing from transmitter to transmitter is appropriately transmitted along with the differing regional information. In this fashion an optimal usage of frequency is achieved since the information which is to be transmitted in the entire common-wave broadcasting network is transmitted in common-wave broadcasting mode and the differing information is transmitted using frequency multiplexing.

In a preferred method the transmission frequencies of additional receivable or neighboring common-wave broadcasting networks or other radio networks are broadcast with the regionally differing information and/or in a control channel to facilitate a more interference-free and faster program-switching has the advantage of facilitating more rapid switching of the radio program received in the receiver. This is particularly necessary when receiving radio programs limited to small regions. In this fashion the waiting times associated with station finding are avoided.

In a preferred method embodiment in accordance with the invention a multiplexer scrambles the radio program to be introduced in frequency and/or time to form a partial transmission channel, and a circuit configuration introduces this signal into a transmission channel of the signal broadcast in common-wave broadcasting mode, and a circuit configuration produces an identifier which contains information concerning the transmission channel used therefor and subdivided into partial transmission channels. These components serve to scramble the radio programs transmitted via the partial transmission channels in accordance with a method known to the receiver to achieve high immunity to interference. A circuit is additionally provided for which introduces the local radio programs into the transmission signal in a time synchronous and frequency synchronous fashion. A circuit for the production of a special identifier is provided to characterize the transmission channel which is subdivided into partial transmission channels. The identifier simultaneously facilitates transmission of which of the partial transmission channels can or are allowed to be received in which region.

In an embodiment of this transmitter a switching configuration produces information which controls the tuning of the receiver in such a fashion that a particular partial transmission channel is received and a circuit configuration introduces this information in the transmitter into the control channel. This embodiment advantageously comprises a circuit which produces a control signal for tuning the receiver to automatically tune same to the proper partial transmission channel.

A preferred method for the reception of local radio programs is characterized in that that reception of an identifier indicating subdivision of a transmission channel into partial transmission channels facilitates switching of the decoding to a partial transmission channel in dependence on the transmission channel received in the receiver, and the receiver tunes to one of the two partial transmission channels using information transmitted in the control channel, using a transmitter identification and a receiver location, or using the reception quality. This has the advantage that the transmitted identifier as well as the control information for tuning of the receiver is evaluated on one of the partial transmission channels to facilitate reception of a plurality of radio programs in one transmission channel.

A preferred receiver is characterized in that a control unit evaluates an identifier indicating subdivision of a transmission channel into two partial transmission channels and the receiver tuning circuit tunes to one partial transmission channel. This has the advantage that a control unit controls the receiver in dependence on the transmission channel to which it is tuned to facilitate reception of a plurality of radio programs transmitted in a plurality of partial transmission channels.

An embodiment of this receiver is characterized in that the control unit evaluates additional identifier information relevant to the transmission channel to which the receiver is tuned and the control device controls tuning of the receiver to the partial transmission channel to which the receiver has been directed by means of the information transmitted by the transmitter in the control channel, or a circuit configuration determines the transmission quality of the two partial transmission channels and the control device utilizes same as criterion for tuning the receiver to one of the two partial transmission channels, or the control device determines the receiver location in a conventional fashion and chooses a partial transmission channel in dependence on a transmitter identification transmitted with the regionally differing information, and the control device switches the receiver to this partial transmission channel. This has the advantage that one of the partial transmission channels and thereby one of the radio programs is automatically selected. A variety of possibilities are possible therefor.

In order to limit the broadcast-region of a radio program, the information transmitted in the control channel advantageously directs the receiver to one partial transmission channel. Alternatively, a circuit configuration can provide for evaluation of the reception field strength in the receiver itself to thereby decide whether a partial transmission channel has sufficiently good transmission quality. An additional possibility is that the receiver recognizes its geographical location, compares same with information transmitted by the receiver with regard to its location and, based on the difference, decides whether a particular partial transmission channel can be decoded or not. The criteria necessary for making a decision therefor, can also be transmitted by the transmitter.

The invention is described and explained in greater detail below in an embodiment.

DESCRIPTION OF THE PREFERRED EMBODIMENT

In the following example one assumes that a transmission channel is subdivided into two partial transmission channels. This means that the transmission capacity available to a transmission channel in the entire common-wave broadcasting network is subdivided into two parts, namely the two partial transmission channels. It is, however, also possible to subdivide the entire available transmission capacity of the transmission system into units of arbitrary size.

The subdivision into partial transmission channels can proceed in such a fashion that a first radio program is transmitted in a first region of the common-wave broadcasting network and a second radio program is transmitted in a second region at a distance therefrom. In this manner interference will occur intermediate to the two regions as a result of which receiver tuning must be controlled via the identifier in such a fashion that tuning to one of the local partial transmission channels cannot occur in the interference region.

An additional possibility for subdivision into partial transmission channels can be effected through reduction of the transmission capacity necessary for the radio programs. For example, by switching to mono operation of a radio program, it is possible to halve its data rate to facilitate transmission of two mono radio programs in one transmission channel. In addition, data reduction and compression can be used to reduce the data rate of a radio program. By means of the identifier, the receiver is instructed that only one partial transmission channel is to be decoded to facilitate reception of one of the radio programs transmitted in the transmission channel. In addition, the identifier can be used for controlling decoding to allow for decoding of only one of the partial transmission channels.

One assumes here that the data rate of two radio programs is reduced by switching to mono operation and that each mono radio program is transmitted in a partial transmission channel or in a mono transmission channel MP1, MP2. Both mono transmission channels form a conventional transmission channel SP2 for a stereo radio signal.

Figure 1:
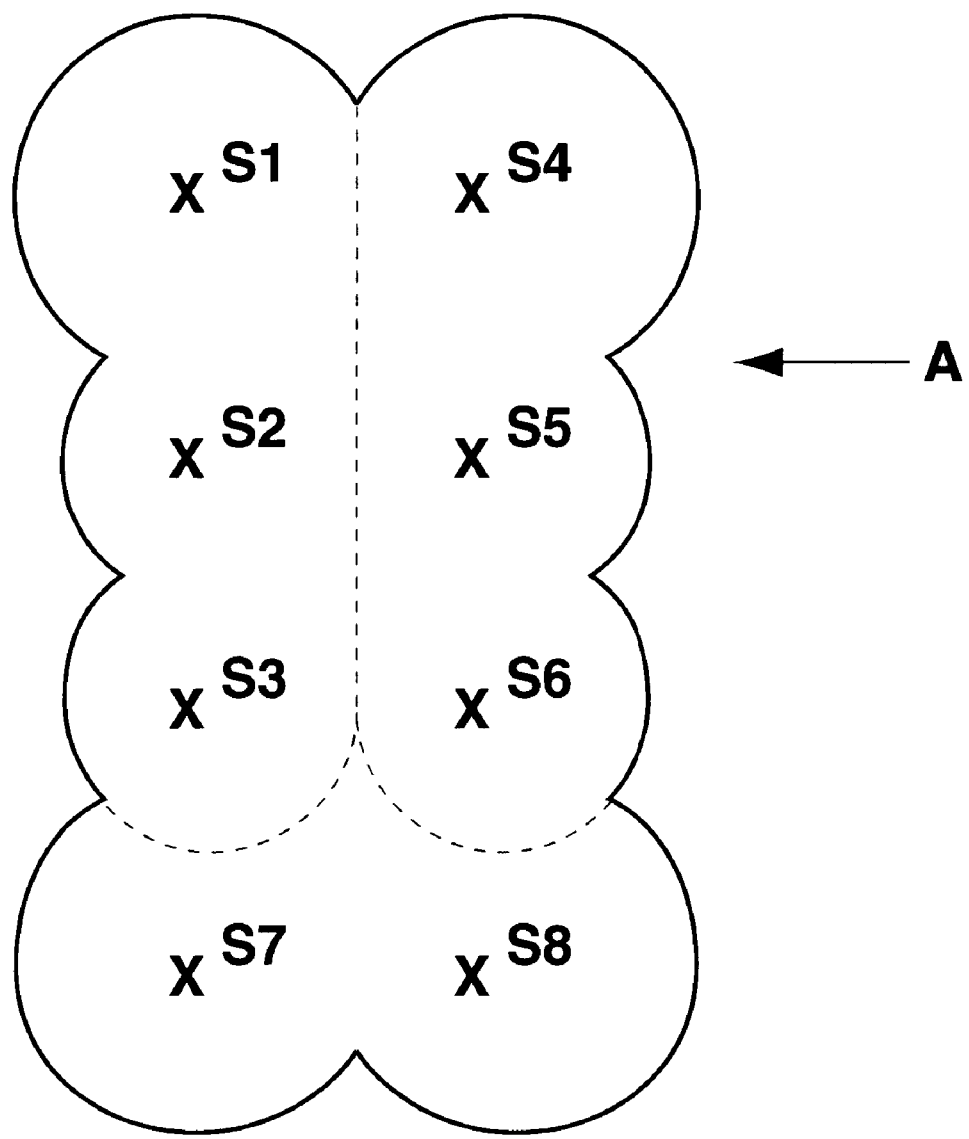
FIG. 1 shows a common-wave broadcasting network with transmitters associated therewith.

FIG. 1 shows a common-wave broadcasting network A having eight transmitters S1 through S8. The common-wave broadcasting network A transmitters S1 through S6 transmit differing local mono radio programs in addition to the stereo radio programs transmitted by all of the transmitters S1 through S8.

A first local mono radio program is transmitted by transmitters S1 through S3 and a second local mono radio program is transmitted by transmitters S4 through S6. The transmitters S7 and S8 do not transmit local radio programs. Since the local radio programs are only sent monophonically, only half of the transmission capacity of a stereo radio program is required.

In this manner, two local radio programs can be broadcast in one single transmission channel SP2.

In order to avoid disruptions, in particular interferences due to the differing local radio programs, the two mono radio programs are transmitted in special mono transmission channels MP1 and MP2. Same have half the transmission capacity of a transmission channel SP2.

Figure 2:
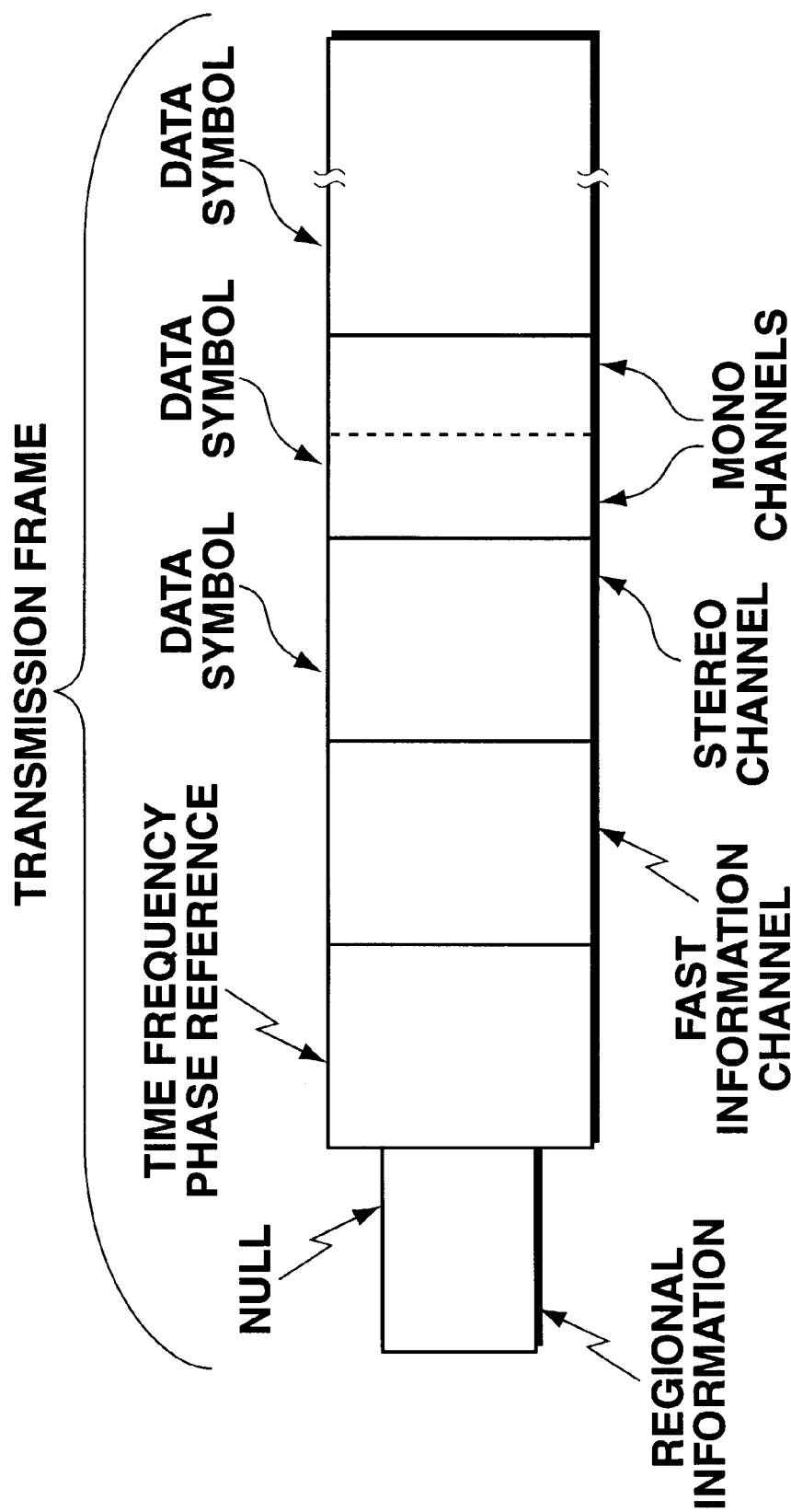
FIG. 2 shows a broadcast signal from a common-wave broadcasting network transmitter.
Figure 3:
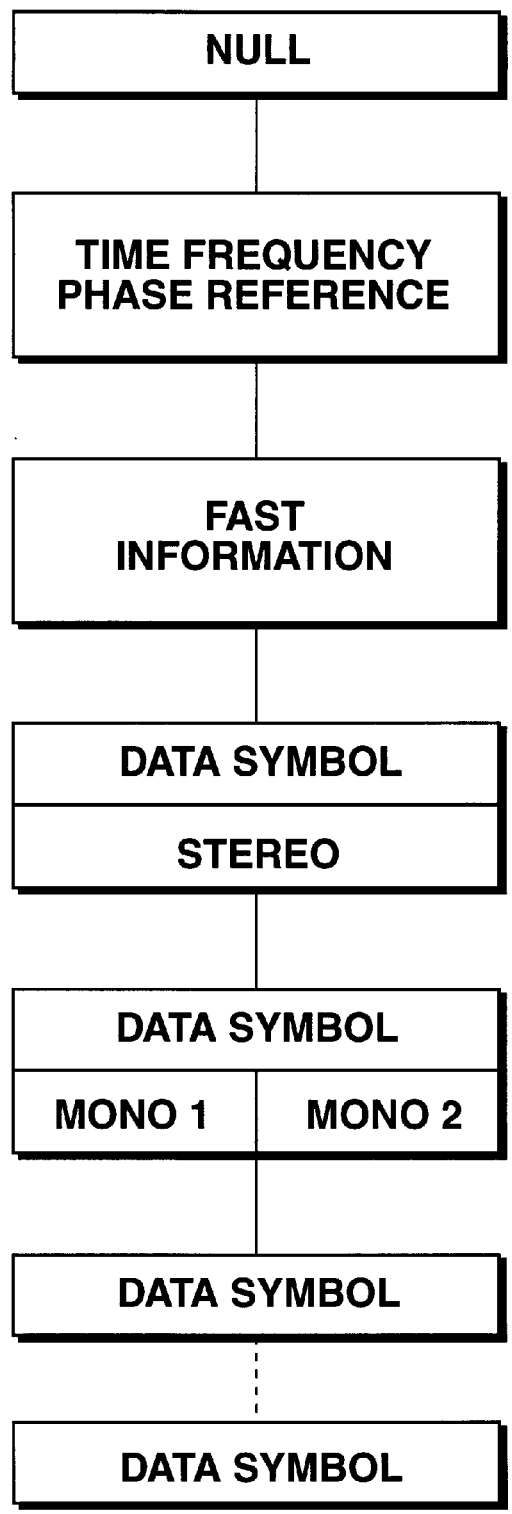
FIG. 3 shows a flow chart for the method in accordance with the invention.

FIG. 2 shows an example of a transmission frame of transmission signal GS in the common-wave broadcasting network A. FIG. 3 shows a flow chart of a method for structuring the transmission frame. The transmission frame starts with the zero-symbol NULL, in which regionally differing information RI is transmitted. This is not broadcast in common-wave transmitter broadcasting mode, rather in a conventional fashion e.g. using individual frequencies for each transmitter as is known in the art of VHF radio. The time-frequency-phase reference symbol TFPR subsequently follows. This, as are all subsequent symbols of the transmission frame, is transmitted in common-wave broadcasting mode and serves to tune the receiver. Subsequent thereto information for the control of the receiver with respect to the subdivision of the transmission capacity of the subsequent transmission frame data symbols DS is broadcast in fast information channel FIC symbols. A first data symbol DS having a transmission capacity required for stereo radio programs forms a first transmission channel SP1. Two mono radio programs are transmitted in the subsequent data symbol DS. The stereo transmission channel SP2 formed via data symbols DS is therefor subdivided into two mono transmission channels MP1 and MP2. This subdivision is advantageously effected in frequency by subdividing the band width utilized for transmission in common-wave broadcasting mode into at least two frequency blocks with at least one of these frequency blocks being used for each mono transmission channel MP1 and MP2.

In addition or alternatively thereto it is possible for subdivision in time to be effected. Through a subdivision in a plurality of time and/or frequency blocks an increased insensitivity of the transmission channel to selective frequency and/or time interference can be achieved.

A stereo mono identifier SMK is transmitted to facilitate a rapid and error-free recognition by the receiver of this subdivision of a stereo transmission channel SP2 into two mono transmission channels MP1 and MP2, wherein the receiver recognizes which data symbol DS and thereby which transmission channel SP has been subdivided into two mono transmission channels MP1 and MP2.

In this fashion decoding of the received data from stereo evaluation to mono evaluation is automatically switched in the receiver when same is tuned to the stereo transmission channel SP2.

The identifier SMK can, for example, be transmitted in the control channel FIC. In addition thereto, reception of this identifier SMK by the receiver can trigger evaluation of regionally differing information RI transmitted in the zero symbol to, for each transmitter, individually notify the receiver as to in which of the two mono transmission channels MP1 or MP2 the local mono radio program can be received.

Alternatively thereto, this mapping of the partial transmission channels transmitted via the differing regional information RI can also be broadcast in the control channel FIC for all partial transmission channels available in the common-wave broadcasting network.

Another alternative is that the identifier SMK is transmitted together with the regionally differing information RI in the zero symbol. In this fashion the identifier SMK can also contain the mono transmission channels MP1 or MP2 which can be received in addition to the number of the stereo transmission channel SP2 subdivided into two mono transmission channels MP1 and MP2.

A transmitter is described below which facilitates the transmission of local mono radio programs. This transmitter has the components described below, in addition to the conventional components utilized in a transmitter for common-wave broadcasting networks.

A circuit configuration is initially provided for the scrambling of the mono radio program into the time and frequency blocks of the mono transmission channels MP1 or MP2 of the transmission signal GS provided therefor. Towards this end, the mono radio program is precisely subdivided with respect to time and frequency in preparation for introduction into the transmission signal GS in data bursts. Same can lie in the base band, in an intermediate frequency range, or in the transmission frequency range in dependence on the frequencies at which insertion occurs. If appropriate, the inserted mono radio program must be additionally moved into the desired frequency location.

Subsequent thereto, the mono radio program is introduced into a mono transmission channel MP1 or MP2 of the transmission signal GS by means of an introduction circuit. This can be done in the base band, in an intermediate frequency range or at the transmission frequency.

A circuit configuration for production of an identifier SMK is also required. This circuit configuration produces information concerning the stereo transmission channel SP2 which is subdivided into two mono transmission channels MP1 and MP2. In the event that this identifier SMK is not transmitted the receiver recognizes that only stereo radio programs are being transmitted. The transmission can take place in common-wave broadcasting mode via a control channel FIC as well as via the regionally differing information RI. When transmitting via the regionally differing information RI it is, however, necessary to assure that each transmitter S1 through S8 of a common-wave broadcasting network A in which local mono radio programs MP1 and MP2 are to be transmitted, transmits an identifier SMK. This is necessary to assure that no receiver is tuned to a stereo transmission channel SP2 subdivided into two mono transmission channels MP1 and MP2 which may not be capable of reception in the area in which the receiver is currently located.

Finally, an additional circuit configuration is necessary which individually encodes the mono transmission channel MP1 or MP2 transmitted for each transmitter. The receiver is then tuned to this mono transmission channel. The encoding is effected according to the encoding for the regional differing information RI since, in general, differing mono transmission channels MP1 or MP2 are utilized for each transmitter of the common-wave broadcasting network A. In the event that a transmitter S7 or S8 does not transmit any local mono radio program, no code of this kind is transmitted. Alternatively the mapping of the mono transmission channel in dependence on the reception location can be also effected via the control channel FIC for all regional programs transmitted in the common-wave broadcasting network.

Since the mono transmission channels MP1 and MP2 also transmit the mono radio programs in common-wave broadcasting mode, whereas the mono radio programs are not transmitted by all transmitters S1 through S8 of a common-wave broadcasting network A, plural usage of these mono transmission channels MP1 and MP2 is possible. Towards this end one must assure that two transmitters of a common-wave broadcasting network A using the same mono transmission channel are sufficiently distant from each other that they do not interfere with one another.

The functioning of and the components for a receiver for local mono radio programs which are required in addition to those of conventional common-wave broadcasting receivers (as e.g. known in the art from DE 42 37 692 C1) are described below.

First of all, receiver components are required for decoding and evaluation of the identifier SMK. In the event that an identifier SMK is received, the receiver control device recognizes which stereo transmission channel SP2 is subdivided into two mono transmission channels MP1 and MP2. It is thereby possible for the identifier e.g. to be transmitted in the control channel FIC or along with the regionally differing information RI. The control device subsequently determines whether or not the receiver is tuned to this stereo transmission channel SP2. In the event that the receiver is not tuned to this stereo transmission channel SP2, subsequent processing does not differ from that of a conventional common-wave broadcasting receiver.

In the event that the control device determines that the receiver is tuned to this stereo transmission channel SP2, an attempt is made by a decoder to decode regional transmitted information RI to determine which of the two mono transmission channels MP1 or MP2 can be received. If this attempt is not successful the control device recognizes the presence of local mono radio programs within the common-wave broadcasting network A which are, however, not from a transmitter which can be presently received. That is to say the stereo transmission channel SP2, for example in the reception area of transmitters S7 or S8, does not transmit a signal of sufficient quality. The receiver is therefore either muted by the control device or automatically tuned to another transmission channel. In the event that the receiver can decode a code pointing to a mono transmission channel MP1 or MP2, the receiver tunes itself thereto and switches to mono reception modality to output one of the two mono radio programs.

There are, alternative to direct mapping of one of the two mono transmission channels MP1 or MP2 by a transmitter, additional possibilities from which one can choose. One of the two mono transmission channels MP1 and MP2 can be chosen for output based on the reception strength when a minimal field strength required for good reception is exceeded. In addition, the receiver can choose a mono transmission channel MP1 or MP2 used by the most proximate transmitter for transmission of a mono radio program to the extent that the receiver is capable of determining its geographical position or receives information regarding same. Towards this end it is necessary that each transmitter broadcast an identification signal or transmit its location to the receiver. A maximum separation between the receiver and the transmitter can thereby not be exceeded. Subsequently, the control device likewise switches the receiver to mono reception mode.

We claim:

1. A method for transmission of local radio programs in a common-wave broadcasting network, the method comprising the steps of:
   a) generating, in a transmission frame, a null time window in which no common-wave signals are present;
   b) transmitting regionally differing information during said null time window;
   c) generating, in said transmission frame, a common-wave time-frequency-phase reference symbol following steps a) and b);
   d) generating, in said transmission frame, a common-wave fast information symbol following steps a) and b);
   e) generating, in said transmission frame, a first stereo common-wave transmission channel followings steps c) and d);
   f) generating, in said transmission frame, a second stereo common-wave transmission channel following steps c) and d);
   g) subdividing said second stereo common-wave transmission channel, in at least one of frequency and time, into a first and a second mono transmission channel;
   h) inserting an identifier into one of said null time window and said fast information channel, said identifier indicating locations of said first and said second mono transmission channels; and
   i) assigning a first local radio program to said first mono transmission channel and a second local radio program to said second mono transmission channel.

2. The method of claim 1, further comprising selecting a subset of transmitters tuned to the common-wave broadcasting network for subdivision into said first and said second mono transmission channels.

3. The method of claim 1, further comprising broadcasting transmission frequencies of additional radio networks in a control channel to reduce interference and speed switching.

4. The method of claim 1, further comprising scrambling a transmission time window width in time and a transmission bandwidth in frequency for said first and said second mono transmission channels to increase resistance to interference.

5. The method of claim 1 further comprising the steps of:
   j) receiving said identifier;
   k) decoding one of said first and said second mono transmission channels; and
   l) tuning to one of said first and said second mono transmission channels in response to information transmitted in a control channel.

6. The method of claim 1, further comprising the steps of:
   j) receiving said identifier;
   k) decoding one of said first and said second mono transmission channels; and
   l) tuning to one of said first and said second mono transmission channels in response to a transmitter identification and a receiver location.

7. The method of claim 1, further comprising the steps of:
   j) receiving said identifier;
   k) decoding one of said first and said second mono transmission channels; and
   l) tuning to one of said first and said second mono transmission channels in response to a reception quality.

* * * * *